(12) United States Patent
Jang et al.

(10) Patent No.: US 11,170,774 B2
(45) Date of Patent: Nov. 9, 2021

(54) VIRTUAL ASSISTANT DEVICE

(71) Applicant: QUALCOMM Incorporated, San Diego, CA (US)

(72) Inventors: Hye Jin Jang, Seoul (KR); Sungrack Yun, Seongnam-si (KR); Kyu Woong Hwang, Daejeon (KR)

(73) Assignee: Qualcomm Incorproated, San Diego, CA (US)

( * ) Notice: Subject to any disclaimer, the term of this patent is extended or adjusted under 35 U.S.C. 154(b) by 175 days.

(21) Appl. No.: 16/418,783

(22) Filed: May 21, 2019

(65) Prior Publication Data

US 2020/0372906 A1 Nov. 26, 2020

(51) Int. Cl.
*G10L 15/22* (2006.01)
*G06F 3/16* (2006.01)
*G10L 15/30* (2013.01)
*G06F 3/0484* (2013.01)

(52) U.S. Cl.
CPC .............. *G10L 15/22* (2013.01); *G06F 3/167* (2013.01); *G10L 15/30* (2013.01); *G06F 3/0484* (2013.01); *G10L 2015/223* (2013.01); *G10L 2015/225* (2013.01)

(58) Field of Classification Search
CPC ..... G06F 3/167; G06F 3/0484; H04L 12/282; H04M 2201/40
USPC .................. 704/231–257, 270–275
See application file for complete search history.

(56) References Cited

U.S. PATENT DOCUMENTS

| | | | | |
|---|---|---|---|---|
| 6,584,439 B1* | 6/2003 | Geilhufe | ................. | G06F 3/167 704/270 |
| 7,206,747 B1* | 4/2007 | Morgan | ........................ | 704/251 |
| 9,661,105 B2 | 5/2017 | Sharma et al. | | |
| 9,996,819 B1 | 6/2018 | Modi | | |
| 2002/0013709 A1 | 1/2002 | Ortega et al. | | |
| 2008/0040119 A1* | 2/2008 | Ichikawa | ............... | G10L 15/063 704/275 |
| 2010/0185445 A1* | 7/2010 | Comerford | ............. | G10L 15/22 704/251 |
| 2014/0278413 A1* | 9/2014 | Pitschel | .................. | G10L 15/22 704/243 |

(Continued)

FOREIGN PATENT DOCUMENTS

CN      108831469 A   * 11/2018 ............. G10L 15/22

OTHER PUBLICATIONS

Devlin et al. "BERT: Pre-training of Deep Bidirectional Transformers for Language Understanding". arXiv preprint arXiv:1810.04805, 2018 (Year: 2018).*

(Continued)

*Primary Examiner* — Jesse S Pullias
(74) *Attorney, Agent, or Firm* — Moore IP

(57) ABSTRACT

A device includes a screen and one or more processors configured to provide, at the screen, a graphical user interface (GUI) configured to display data associated with multiple devices on the screen. The GUI is also configured to illustrate a label and at least one control input for each device of the multiple devices. The GUI is also configured to provide feedback to a user. The feedback indicates that a verbal command is not recognized with an action to be performed. The GUI is also configured to provide instructions for the user on how to teach the one or more processors which action is to be performed in response to receiving the verbal command.

30 Claims, 10 Drawing Sheets

(56) References Cited

U.S. PATENT DOCUMENTS

| | | | |
|---|---|---|---|
| 2016/0077794 A1 | 3/2016 | Kim et al. | |
| 2016/0078864 A1* | 3/2016 | Palanisamy | G10L 15/22 |
| | | | 704/235 |
| 2016/0225369 A1* | 8/2016 | Agrawal | G06F 3/04886 |
| 2016/0293164 A1* | 10/2016 | Shi | G10L 15/1815 |
| 2017/0132199 A1 | 5/2017 | Vescovi et al. | |
| 2017/0235824 A1* | 8/2017 | Liu | G06F 40/00 |
| | | | 707/723 |
| 2017/0242653 A1* | 8/2017 | Lang | G10L 15/22 |
| 2017/0345420 A1* | 11/2017 | Barnett, Jr. | G10L 15/22 |
| 2018/0315415 A1 | 11/2018 | Mosley et al. | |
| 2019/0103103 A1* | 4/2019 | Ni | G10L 15/30 |
| 2020/0234699 A1* | 7/2020 | Webster | G06F 40/53 |

OTHER PUBLICATIONS

Conneau A., et al., "Supervised Learning of Universal Sentence Representations from Natural Language Inference Data", Proceedings of the 2017 Conference on Empirical Methods in Natural Language Processing, 2017, pp. 670-680.

Devlin J., et al., "BERT: Pre-training of Deep Bidirectional Transformers for Language Understanding", Oct. 11, 2018, 14 pages.

Mikolov T., et al., "Distributed Representations of Words and Phrases and their Compositionality", NIPS'13 Proceedings of the 26th International Conference on Neural Information Processing Systems, 2013, vol. 2, pp. 3111-3119.

Peters M.E., et al., "Deep Contextualized Word Representations", Mar. 22, 2018, 15 pages.

International Search Report and Written Opinion—PCT/US2020/034061—ISA/EPO—dated Aug. 3, 2020.

* cited by examiner

VIRTUAL ASSISTANT DEVICE

I. FIELD

The present disclosure is generally related to a virtual assistant.

II. DESCRIPTION OF RELATED ART

Advances in technology have resulted in smaller and more powerful computing devices. For example, a variety of portable personal computing devices, including wireless telephones such as mobile and smart phones, tablets, and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Speech recognition devices, such as virtual assistants, can translate spoken commands into actions that are to be performed. A speech recognition device typically enables a user to customize operations of the speech recognition device by training the speech recognition device to associate a particular action with a particular spoken command chosen by the user. As a result, command recognition and response can be personalized for individual users and settings.

However, when a user trains a virtual assistant to associate the particular spoken command with the particular action, the virtual assistant typically has difficulty associating slightly different versions of the command with the same action. For example, a virtual assistant trained to recognize the command "turn on the lights" may not be able to recognize the user command "hey, can you turn the lights on?" To enable understanding of slightly different versions of the command with the same action, traditional methods usually require ontology design, which requires an expert's knowledge and labor, and a large amount of data to train the model.

III. SUMMARY

According to one implementation of the techniques disclosed herein, a device includes a screen and one or more processors configured to provide, at the screen, a graphical user interface (GUI) configured to display data associated with multiple devices on the screen. The GUI is also configured to illustrate a label and at least one control input for each device of the multiple devices. The GUI is also configured to provide feedback to a user. The feedback indicates that a verbal command is not recognized with an action to be performed. The device is also configured to provide instructions for the user on how to teach the one or more processors which action is to be performed in response to receiving the verbal command. For example, the instructions can be displayed via the GUI or can be provided via another technique, such as a verbal instruction provided via a speaker of the device.

According to another implementation of the techniques disclosed herein, a method of teaching a virtual assistant device an action to be performed in response to receiving a command includes displaying, at a graphical user interface (GUI), data associated with multiple devices on a screen. The method also includes illustrating a label and at least one control input for each device of the multiple devices. The method also includes providing feedback to a user. The feedback indicates that a verbal command is not recognized as being associated with an action to be performed. The method further includes providing instructions for the user on how to teach one or more processors which action is to be performed in response to receiving the verbal command.

According to another implementation of the techniques disclosed herein, a non-transitory computer-readable medium includes instructions for teaching a virtual assistant device an action to be performed in response to receiving a command. The instructions, when executed by one or more processors, cause the one or more processors to display, at a graphical user interface (GUI), data associated with multiple devices on a screen. The instructions are also executable to cause the one or more processors to illustrate a label and at least one control input for each device of the multiple devices. The instructions are also executable to cause the one or more processors to provide feedback to a user. The feedback indicates that a verbal command is not recognized as being associated with an action to be performed. The instructions are further executable to cause the one or more processors to provide instructions for the user on how to teach the one or more processors which action is to be performed in response to receiving the verbal command.

According to another implementation of the techniques disclosed herein, an apparatus includes means for receiving an audio signal corresponding to a verbal command. The apparatus also includes means for processing the audio signal to generate a vector associated with the verbal command. The apparatus further includes means for storing one or more vectors that are associated with respective actions. The apparatus also includes means for identifying a particular stored vector from the means for storing. The particular stored vector is identified at least partially based on a difference between the vector and the particular stored vector, and the particular stored vector is identified in response to a determination that the vector does not match any stored vector from the means for storing. The apparatus also includes means for initiating performance of a particular action that is associated with the particular stored vector in response to a determination that the difference between the vector and the particular stored vector satisfy a difference constraint.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
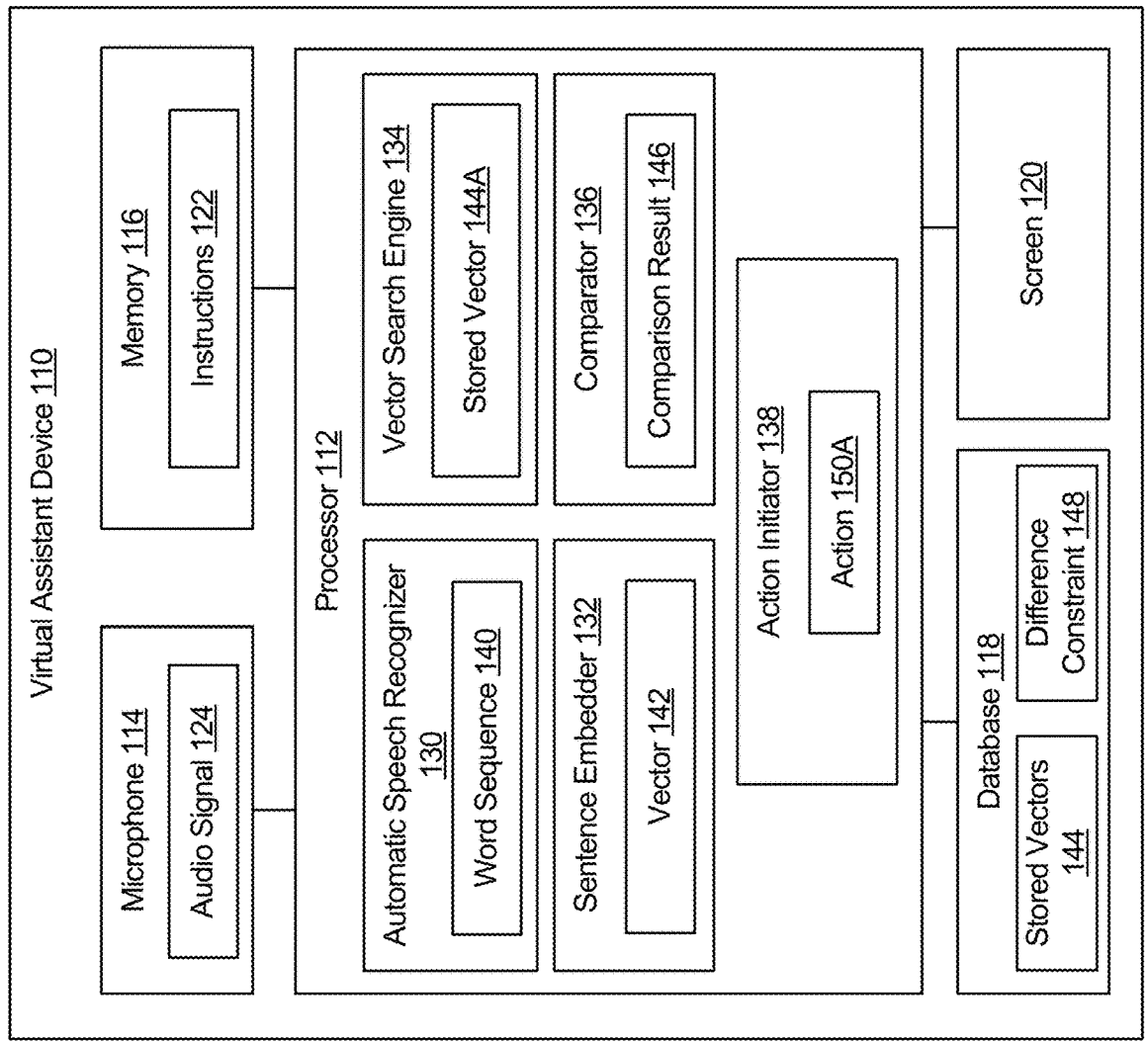
FIG. 1 is an illustrative example of a system that includes a virtual assistant device configured to determine an action associated with a verbal command.
Figure 1:
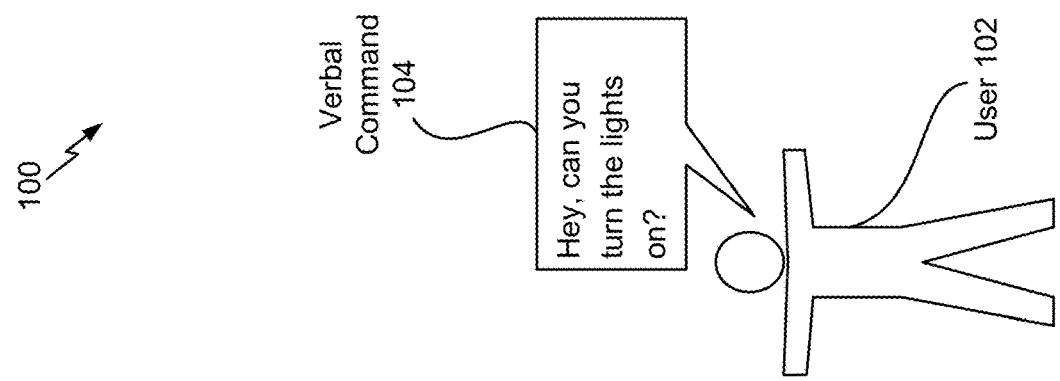

Speech recognition devices, such as virtual assistants, typically enable users to customize operations by training a speech recognition device to associate a particular action with a particular spoken command chosen by the user. As a result, command recognition and response can be personalized for individual users and settings. However, when a user trains a virtual assistant to associate the particular spoken command with the particular action, the virtual assistant typically has difficulty associating slightly different versions of the command with the same action. To enable understanding of slightly different versions of the command with the same action, traditional methods usually require ontology design, which requires an expert's knowledge and labor, and a large amount of data to train the model. Although a user may attempt to proactively train a virtual assistant to recognize each variation of the command that the user is likely to speak to the virtual assistant, performing such training can be confusing and time consuming for the user, and the virtual device may not support training of multiple commands that are associated with the same action.

Techniques described herein enable a virtual assistant device to map slightly different versions a particular user command to an action associated with the particular user command. For example, the virtual assistant device can capture a modified version of the particular user command and generate a speech vector based on the modified version. For example, if the particular command is "turn on the lights" and the modified version of the particular user command captured by the virtual assistant device is "activate the lights," the speech vector generated by the virtual assistant device reflects the phrase "activate the lights." The virtual assistant device may compare the speech vector with a stored speech vector for the particular command to determine whether differences between vector properties of the vectors are within a threshold. If the differences are within the threshold, the virtual assistant device performs (or initiates) the action associated with the particular command. In the above-described scenario, the virtual assistant device activates the lights. However, if the differences are not within the threshold, the command is not recognized as being associated with an action.

In response to receiving a command that is not recognized as being associated with an action, the virtual assistant device generates a prompt that instructs a user how to teach the virtual assistant device to act in response to detecting the command. By instructing the user how to teach the virtual assistant device how to act in response to detecting an unrecognized command (e.g., a modified version of an existing command), the virtual assistant device can be updated to recognize the command while avoiding the drawbacks associated with ontology design and also avoiding a confusing and time-consuming user-initiated training process. As a result, the virtual assistant device provides an improved user experience and adaptability as compared to conventional assistant devices.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" content (or a signal) may refer to actively generating, estimating, calculating, or determining the content (or the signal) or may refer to using, selecting, or accessing the content (or signal) that is already generated, such as by another component or device.

As used herein, "coupled" may include "communicatively coupled," "electrically coupled," or "physically coupled," and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signal) directly or indirectly, such as via one or more wires, buses, networks, etc.

Referring to FIG. 1, an illustrative example of a system 100 is shown. The system 100 includes a virtual assistant device 110 that is configured to determine an action associated with a verbal command. For example, a verbal command 104 spoken by a user 102 is detected by the virtual assistant device 110, and the virtual assistant device 110 determines an action that is associated with the verbal command 104. According to the example in FIG. 1, the verbal command 104 includes the phrase "Hey, can you turn the lights on?" It should be understood that the phrase indicated in FIG. 1 is for illustrative purposes and should not be construed as limiting. In other implementations, the verbal command 104 can include different phrases.

The virtual assistant device 110 includes one or more processors, illustrated as a processor 112. The virtual assistant device 110 also includes a microphone 114 coupled to the processor 112, a memory 116 coupled to the processor 112, a database 118 coupled to the processor 112, and a screen 120 coupled to the processor 112. The memory 116 is a non-transitory computer-readable device that includes instructions 122 that are executable by the processor 112 to perform the operations described herein. The processor 112 includes an automatic speech recognizer 130, a sentence embedder 132, a vector search engine 134, a comparator 136, and an action initiator 138. According to one implementation, each component 130-138 of the processor 112 can be implemented using dedicated circuitry, such as an application-specific integrated circuit (ASIC) or a field-programmable gate array (FPGA).

The microphone 114 is configured to capture the verbal command 104 and generate an audio signal 124 that corresponds to the verbal command 104. According to one implementation, the audio signal 124 is an analog signal. According to another implementation, the audio signal 124 is a digital signal. For example, in response to capturing the verbal command 104, the microphone 114 can perform an analog-to-digital conversion (ADC) operation to convert the verbal command 104 to a digital signal. The microphone 114 provides the audio signal 124 to the processor 112.

The processor 112 receives the audio signal 124 that corresponds to the verbal command 104. The processor 112 is configured to process the audio signal 124 to generate a vector 142 that is associated with the verbal command 104. For example, the automatic speech recognizer 130 is configured to perform an automatic speech recognition operation on the audio signal 124 to generate a word sequence 140 that corresponds to the verbal command 104. To illustrate, the automatic speech recognizer 130 can create an audio file based on the audio signal 124. The automatic speech recognizer 130 can perform a background noise reduction operation and a volume normalization operation on a waveform in the audio file to generate a filtered waveform. The automatic speech recognizer 130 can generate a plurality of phonemes using the filtered waveform. The automatic speech recognizer 130 can analyze each phoneme using statistical probability analysis to deduce whole words and determine the word sequence 140. According to one implementation, the automatic speech recognizer 130 can use Natural Language Processing to perform the automatic speech recognition operation. The word sequence 140 is provided to the sentence embedder 132.

The sentence embedder 132 is configured to perform a sentence embedding operation on the word sequence 140 to generate the vector 142. According to one implementation, the sentence embedder 132 implements a word-to-vector (word2vec) type of sentence embedding. According to another implementation, the sentence embedder 132 implements an embedding from language model (ELMo) type of sentence embedding. According to another implementation, the sentence embedder 132 implements a type of sentence embedding that provides semantic sentence representations (e.g., InferSent sentence embedding). According to another implementation, the sentence embedder 132 implements a Bidirectional Encoder Representations from Transformers (BERT) type of sentence embedding. The vector 142 is provided to the vector search engine 134 and to the comparator 136.

Figure 2:
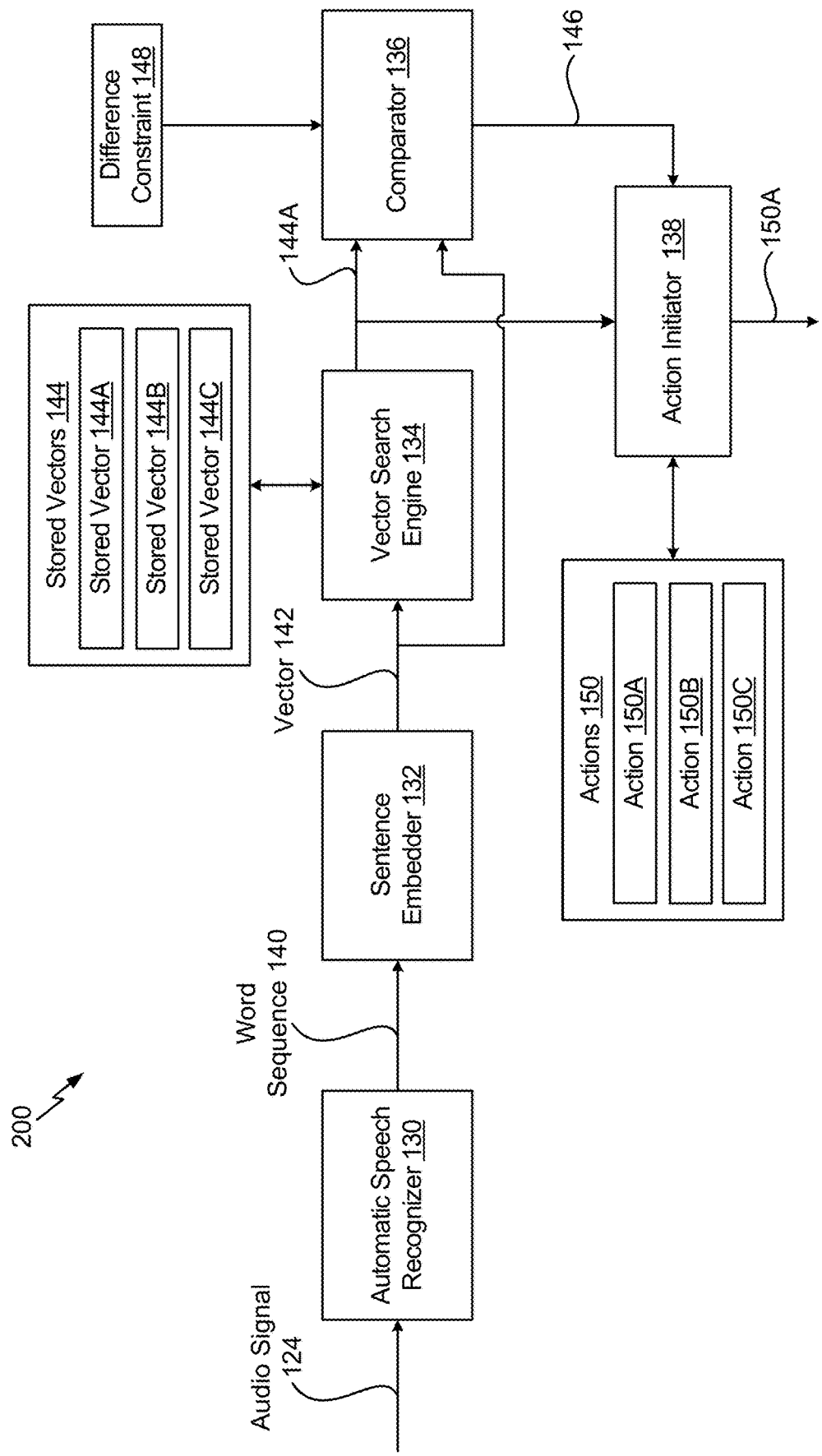
FIG. 2 is an illustrative example of a flowchart for determining an action associated with a verbal command.

The vector search engine 134 is configured to determine whether the vector 142 matches any stored vector 144 of one or more stored vectors 144. For example, the database 118 can store a plurality of vectors 144. Each stored vector 144 is associated with an action to be performed or initiated by the virtual assistant device 110. As a non-limiting example, as depicted in FIG. 2, a stored vector 144A can be associated with an action 150A (e.g., turning on the lights). As another non-limiting example, a stored vector 144B can be associated with an action 150B (e.g., playing music). As another non-limiting example, a stored vector 144C can be associated with an action 150C (e.g., adjusting a temperature). The vector search engine 134 determines whether vector properties of the vector 142 match vector properties of any of the stored vectors 144. In response to a determination that the vector properties of the vector 142 match vector properties of a particular stored vector 144, the action initiator 138 initiates the action 150 corresponding to the particular stored vector 144.

However, because the vector properties of the vector 142 are based on the illustrated phrase (e.g., "Hey, can you turn the lights on?), the vector properties of the vector 142 does not directly match vector properties of the stored vector 144A if the stored vector 144A is generated based on the phrase "turn on the lights." For example, the variance between the phrase "Hey, can you turn the lights on?" associated with the vector 142 and the phrase "turn on the lights" associated with the stored vector 144A can result in vector properties of the vectors 142, 144A not matching, although the vectors 142, 144A are associated with a similar action.

In response to a determination that vector 142 does not match any stored vector 144, the vector search engine 134 can identify a particular stored vector 144, such as the stored vector 144A, as the most similar stored vector at least partially based on a difference between the vector 142 and the particular stored vector 144. For example, the vector search engine 134 is configured to compute difference values between the vector 142 and multiple stored vectors 144A, 144B, 144C of the one or more stored vectors 144 in the database 118. The vector search engine 134 is configured to select the stored vector 144 associated with a smallest computed difference value of the difference values. To illustrate, the difference value between the vector 142 and the stored vector 144A is relatively small because the associated phrases of the vectors 142, 144A are relatively similar. However, the difference values between the vector 142 and the stored vectors 144B, 144C are relatively large because the associated phrases of the vectors 144B, 144C are not similar to the phrase (e.g., "Hey, can you turn the lights on?") associated with the vector 142. Thus, the vector search engine 134 selects the stored vector 144A because the stored vector 144A is associated with the smallest computed difference value.

A difference constraint 148 is stored in the database 118 and is used to determine whether the vector 142 is "similar enough" to the stored vector 144A. For example, the comparator 136 is configured to compare the difference between the vector 142 and the stored vector 144A with the difference constraint 148 to generate a comparison result 146. The comparison result 146 can be a binary value that indicates whether the difference satisfies (e.g., is less than or equal to) the difference constraint 148. For example, if the difference between the vector 142 and the stored vector 144A satisfies the difference constraint 148, the comparison result 146 can be a binary one value. However, if the difference between the vector 142 and the stored vector 144A fails to satisfy the difference constraint 148, the comparison result 146 can be a binary zero value. As described in greater detail with respect to FIG. 3, the action initiator 138 is configured to generate a prompt that is displayed on the screen 120 if the comparison result 146 is a binary zero value (e.g., if the difference fails to satisfy the difference constraint 148).

As illustrated with respect to FIG. 1, the action initiator 138 is configured to initiate performance of the action 150A associated with the stored vector 144A in response to the difference between the vector 142 and the stored vector 144A satisfying the difference constraint 148 (e.g., if the comparison result 146 is a binary one value). Thus, according to the scenario described above, the action initiator 138 can initiate turning on the lights (e.g., the action 150A) in response to the difference between the vector 142 and the stored vector 144A satisfying the difference constraint 148.

Thus, the system 100 enables a slightly different version of a stored command, associated with a particular action, to be executed without additional ontology design. For example, a vector (e.g., the vector 142) associated with the slightly different version of the stored command is compared to a stored vector (e.g., the stored vector 144A) associated with the stored command. If the difference between the vectors 142, 144A satisfies the difference constraint 148, the virtual assistant device 110 can perform the particular action 150A associated with the stored command. As a result, a slightly different version of the stored command can be interpreted and executed as the stored command. For example, the virtual assistant device 110 can interpret and execute the phrase "Hey, can you turn the lights on?" as if it were the stored command "turn on the lights." Thus, by using sentence embedding to generate the vector 142 and comparing the vector 142 to stored vectors 144, the virtual assistant device 110 enables selection of an action to be performed based on a similarity of a command spoken by the user 102 to a previously enrolled command (represented by a vector in the stored vectors 144).

Referring to FIG. 2, a non-limiting example of a system 200 that includes components that can be implemented in the virtual assistant device 110 of FIG. 1 is shown. The system 200 includes the automatic speech recognizer 130, the sentence embedder 132, the vector search engine 134, the comparator 136, and the action initiator 138. In some implementations, operations of the system 200 can be performed by the processor 112 of FIG. 1. In other implementations, one or more of the components 130-138 are implemented via circuitry or dedicated hardware.

In FIG. 2, the audio signal 124 is provided to the automatic speech recognizer 130. The automatic speech recognizer 130 performs an automatic speech recognition operation on the audio signal 124 to generate the word sequence 140 that corresponds to the verbal command 104. According to one implementation, the automatic speech recognizer 130 uses Natural Language Processing to perform the automatic speech recognition operation. The word sequence 140 is provided to the sentence embedder 132. The sentence embedder 132 performs a sentence embedding operation on the word sequence 140 to generate the vector 142. The vector 142 is provided to the vector search engine 134 and to the comparator 136.

The vector search engine 134 determines whether the vector 142 matches any of the stored vectors 144, illustrated as representative stored vectors 144A, 144B, 144C. For example, the vector search engine 134 determines whether vector properties of the vector 142 match vector properties of any of the stored vectors 144A, 144B, 144C. Because the vector properties of the vector 142 are based on the verbal command 104 (e.g., "Hey, can you turn the lights on?), the vector properties of the vector 142 do not directly match vector properties of the stored vector 144A if the stored vector 144A is generated based on the phrase "turn on the lights." For example, the variance between the phrase "Hey, can you turn the lights on?" associated with the vector 142 and the phrase "turn on the lights" associated with the stored vector 144A results in vector properties of the vectors 142, 144A not matching, although the vectors 142, 144A are associated with a similar action.

In response to a determination that vector 142 does not match any stored vector 144, the vector search engine 134 identifies the particular stored vector 144A at least partially based on a difference between the vector 142 and the particular stored vector 144A. For example, the vector search engine 134 computes difference values between the vector 142 and the stored vectors 144A, 144B, 144C. The vector search engine 134 selects the stored vector 144A associated with the smallest computed difference value. To illustrate, the difference value between the vector 142 and the stored vector 144A is relatively small because the associated phrases of the vectors 142, 144A are relatively similar. However, the difference values between the vector 142 and the stored vectors 144B, 144C are relatively large because the associated phrases of the vectors 144B, 144C are not similar to the phrase (e.g., "Hey, can you turn the lights on?") associated with the vector 142. Thus, the vector search engine 134 selects the stored vector 144A because the stored vector 144A is associated with the smallest computed difference value. The stored vector 144A and the vector 142 are provided to the comparator 136.

The comparator 136 compares the difference between the vector 142 and the stored vector 144A with the difference constraint 148 to generate the comparison result 146. Because the difference between the vector 142 and the stored vector 144A satisfies the difference constraint 148, the comparison result 146 is a binary one value. The comparison result 146 is provided to the action initiator 138. The stored vector 144A is also provided to the action initiator 138 because the difference between the vector 142 and the stored vector 144A satisfies the difference constraint 148.

The action initiator 138 initiates performance of the action 150A associated with the stored vector 144A in response to the difference between the vector 142 and the stored vector 144A satisfying the difference constraint 148 (e.g., if the comparison result 146 is a binary one value). Thus, according to the scenario illustrated in FIG. 2, the action initiator 138 initiates turning on the lights (e.g., the action 150A) in response to the difference between the vector 142 and the stored vector 144A satisfying the difference constraint 148.

Thus, the system 200 enables a slightly different version of a stored command, associated with a particular action, to be executed without additional ontology design. For example, a vector (e.g., the vector 142) associated with the slightly different version of the stored command is compared to a stored vector (e.g., the stored vector 144A) associated with the stored command. If the difference between the vectors satisfies the difference constraint, the virtual assistant device 110 can perform the particular action associated with the stored command. As a result, a slightly different version of the stored command can be interpreted and executed as the stored command. For example, the virtual assistant device 110 can interpret and execute the phrase "Hey, can you turn the lights on?" as if it were the stored command "turn on the lights."

Figure 3:
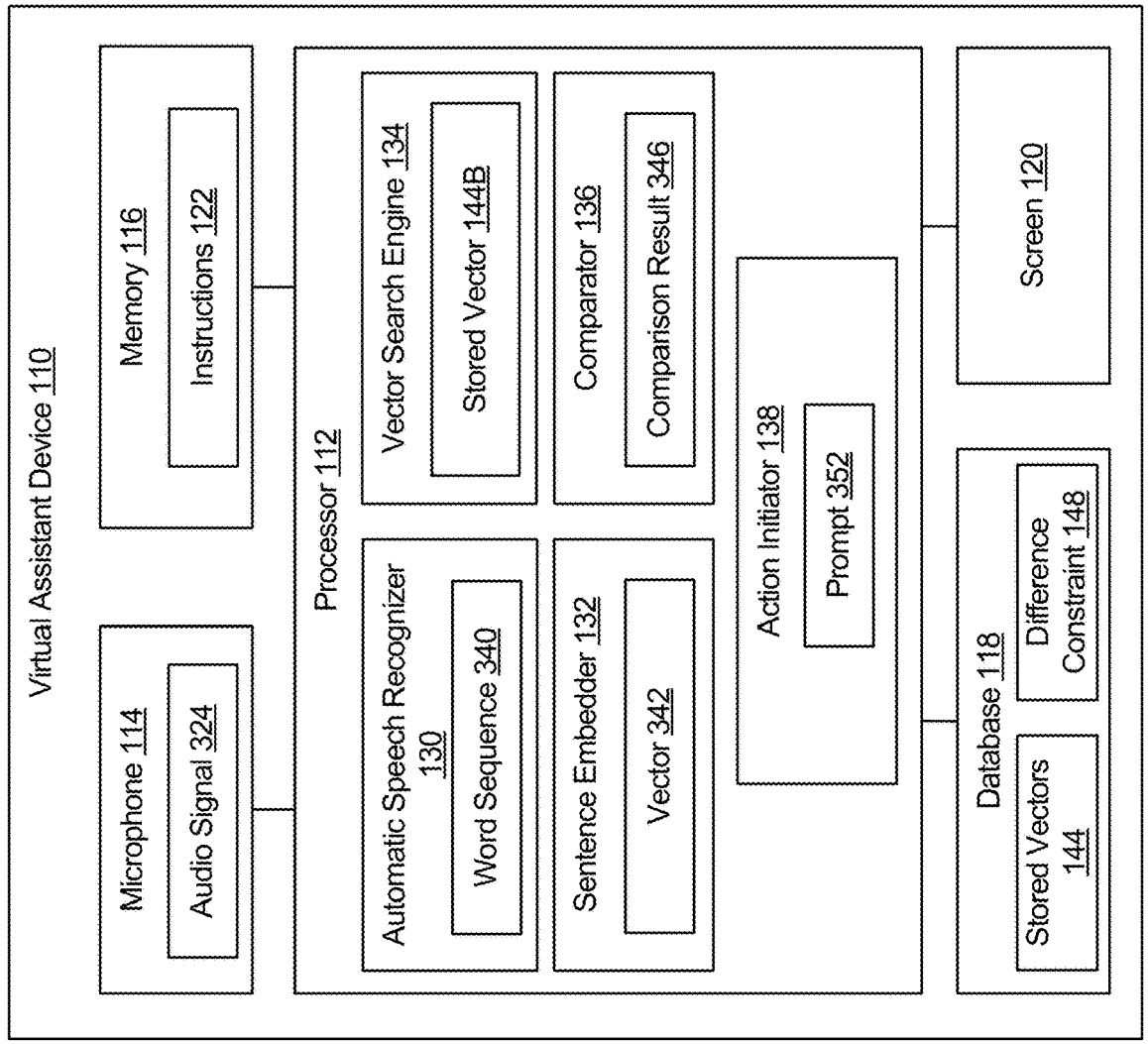
FIG. 3 is an illustrative example of a system that is includes a virtual assistant device configured to provide feedback to a user indicating that the virtual assistant device does not recognize a verbal command as being associated with an action to be performed.
Figure 3:
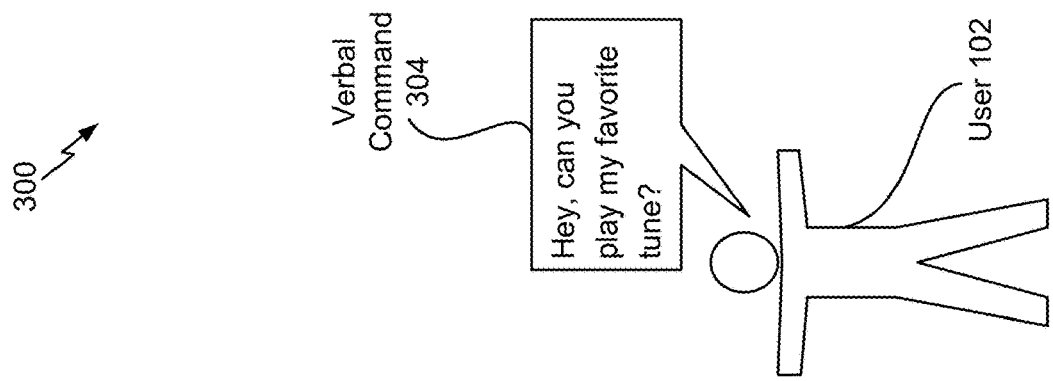

Referring to FIG. 3, an illustrative example of a system 300 is shown. The system 300 includes the virtual assistant device 110 that is configured to provide feedback to a user indicating that the virtual assistant device 110 does not recognize a verbal command as being associated with an action to be performed. In FIG. 3, a verbal command 304 spoken by the user 102 is detected by the virtual assistant device 110, and the virtual assistant device 110 generate a prompt 352 (e.g., feedback) instructing the user 102 how to teach the virtual assistant device 110 which action is to be performed. According to example in FIG. 3, the verbal command 304 includes the phrase "Hey, can you play my favorite tune?" It should be understood that the phase indicated in FIG. 3 is for illustrative purposes and should not be construed as limiting. In other implementations, the verbal command 304 can include different phrases.

The microphone 114 is configured to capture the verbal command 304 and generate an audio signal 324 that corresponds to the verbal command 304. According to one implementation, the audio signal 324 is an analog signal. According to another implementation, the audio signal 324 is a digital signal. For example, in response to capturing the verbal command 304, the microphone 114 can perform an ADC operation to convert the verbal command 304 to a digital signal. The microphone 114 provides the audio signal 324 to the processor 112.

The processor 112 receives the audio signal 324 that corresponds to the verbal command 304. The processor 112 is configured to process the audio signal 324 to generate a vector 342 that is associated with the verbal command 304. For example, in a similar manner as described with respect to FIG. 1, the automatic speech recognizer 130 is configured to perform an automatic speech recognition operation on the audio signal 324 to generate a word sequence 340 that corresponds to the verbal command 304. The word sequence 340 is provided to the sentence embedder 132. In a similar manner as described with respect to FIG. 1, the sentence embedder 132 is configured to perform a sentence embedding operation on the word sequence 340 to generate the vector 342. The vector 342 is provided to the vector search engine 134 and to the comparator 136.

The vector search engine 134 is configured to determine whether the vector 342 matches any stored vector 144 of one or more stored vectors 144. Because the vector properties of the vector 342 are based on the illustrated phrase (e.g., "Hey, can you play my favorite tune?"), the vector properties of the vector 342 does not directly match vector properties of the stored vector 144B if the stored vector 144B is generated based on the phrase "play some music." For example, the variance between the phrase "Hey, can you play my favorite tune?" associated with the vector 342 and the phrase "play some music" associated with the stored vector 144B can result in vector properties of the vectors 342, 144B not matching, although the vectors 342, 144B are associated with a similar action.

In response to a determination that vector 342 does not match any stored vector 144, the vector search engine 134 can identify a particular stored vector 144, such as the stored vector 144B, at least partially based on a difference between the vector 342 and the particular stored vector 144. For example, the vector search engine 134 is configured to compute difference values between the vector 342 and the stored vectors 144A, 144B, 144C in the database 118. The vector search engine 134 is configured to select the stored vector 144B associated with a smallest computed difference value. To illustrate, the difference value between the vector 342 and the stored vector 144B is smaller than the difference values between the vector 342 and the vectors 144A, 144C. Thus, the vector search engine 134 selects the stored vector 144B because the stored vector 144B is associated with the smallest computed difference value.

The comparator 136 is configured to compare the difference between the vector 342 and the stored vector 144B with the difference constraint 148 to generate a comparison result 346. The comparison result 346 can be a binary value that indicates whether the difference satisfies (e.g., is less than or equal to) the difference constraint 148. For example, if the difference between the vector 342 and the stored vector 144B satisfies the difference constraint 148, the comparison result 346 can be a binary one value. However, if the difference between the vector 342 and the stored vector 144B fail to satisfy the difference constraint 148, the comparison result 346 can be a binary zero value. In the example of FIG. 3, the action initiator 138 is configured to generate the prompt 352 that is displayed at the screen 120 because the comparison result 346 is a binary zero value (e.g., the difference fails to satisfy the difference constraint 148). The prompt 352 can be used to instruct the user 102 how to teach the virtual assistant device 110 which action is to be performed. An illustrative example of the prompt 352 displayed at the screen 120 is shown in FIG. 4.

Figure 4:
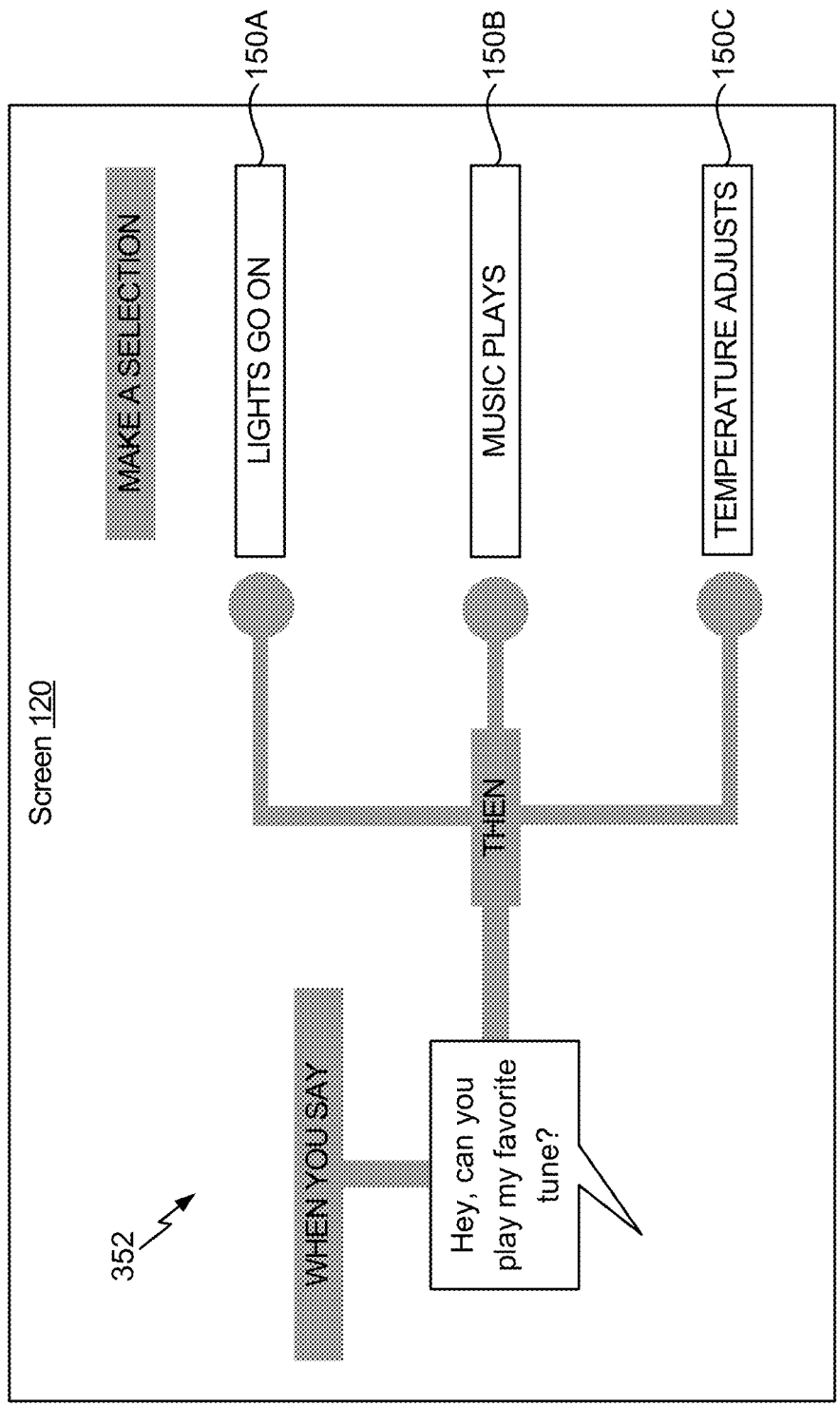
FIG. 4 is an illustrative example of a prompt generated by a virtual assistant device.

FIG. 4 is an illustrative example of a prompt displayed at a screen. For example, in FIG. 4, an illustrative example of the prompt 352 is displayed at the screen 120. In FIG. 4, the prompt 352 enables the user 102 to select from the first action 150A, the second action 150B, or the third action 150C in response to the virtual assistant device 110 detecting the verbal command 304. For example, because the virtual assistant device 110 was unable to identify a stored vector 144 that is substantially similar to the vector 342 associated with the verbal command 304, the action initiator 138 generates the prompt 352 illustrated in FIG. 4.

The prompt 352 instructs the user 102 on how to teach the virtual assistant device 110 which action is to be performed in response to receiving a verbal command (e.g., the verbal command 304). For example, the user 102 can select the first action 150A, the second action 150B, or the third action 150C by touching a corresponding area on the screen 120. In the illustrative example of FIG. 4, if the user 102 selects the second action 150B (e.g. "music plays") in response to receiving the prompt 352, the virtual assistant device 110 can store the vector 342 associated with the verbal command 304 in the database 118 and can associate the second action 150B with the vector. As a result, in the future, the virtual assistant device 110 (e.g., the action initiator 138) can initiate the second action 150B in response to receiving the verbal command 304 or a verbal command that produces a vector that is similar to the vector 342.

Thus, the techniques described with respect to FIGS. 3-4 enable the virtual assistant device 110 to dynamically associate unrecognized spoken commands with user actions through use of user interaction with the prompt 352 displayed at the screen 120.

Figure 5:
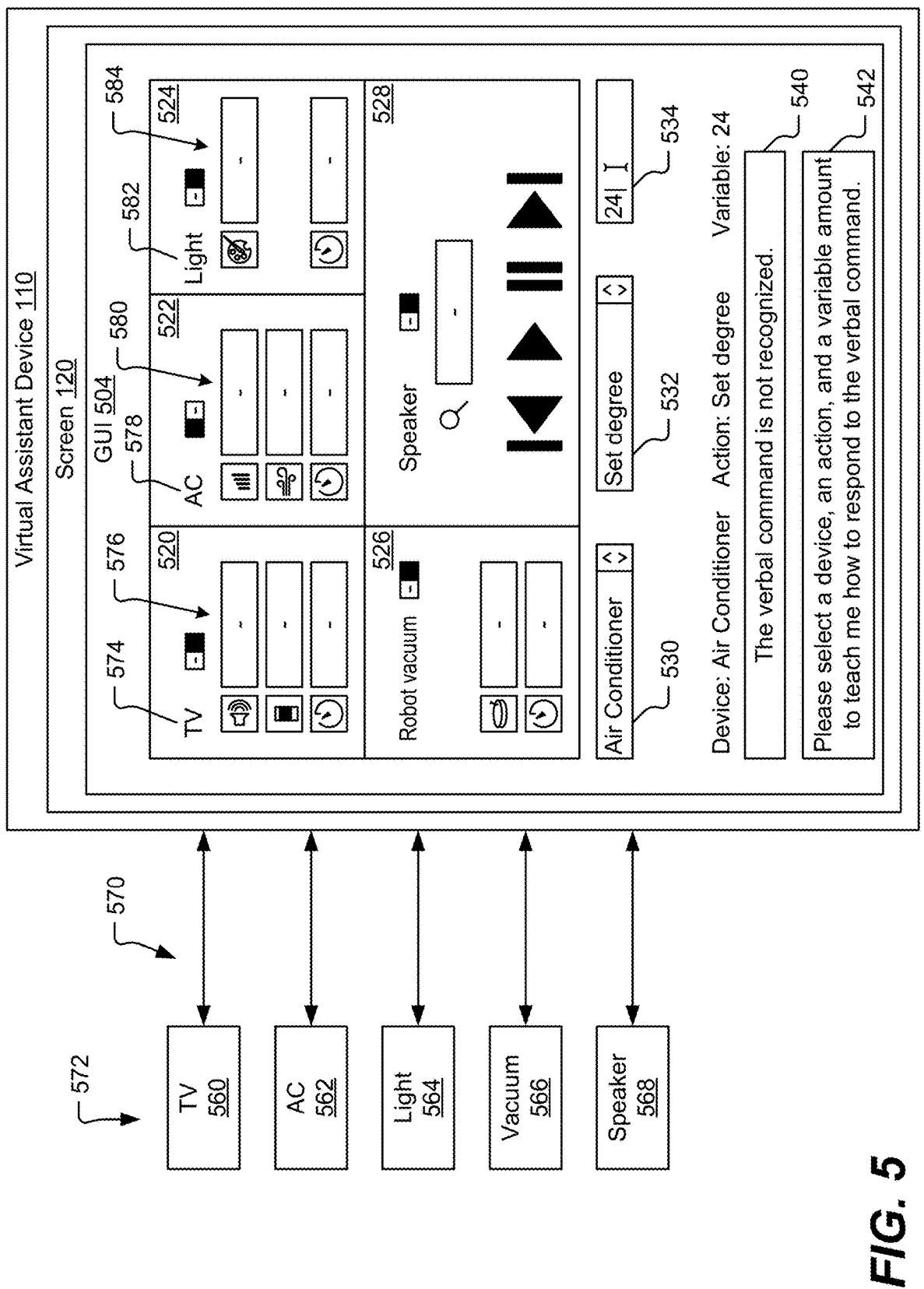
FIG. 5 is an illustrative example of a virtual assistant device that communicates control signals to a plurality of devices.

FIG. 5 depicts another example of the virtual assistant device 110. In the example of FIG. 5, the screen 120 displays a user interface, such as a graphical user interface (GUI) 504. For example, the processor 112 is configured to provide the GUI 504 at the screen 120.

The GUI 504 is configured to send and receive messages 570 from multiple devices 572 that are in communication with the virtual assistant device 110. In the illustrative example of FIG. 5, the multiple devices 572 includes a television (TV) 560, an air conditioning system (AC) 562, a lighting device 564, a robot vacuum device 566, and a speaker 568. In other implementations, the multiple devices 572 can include additional devices, such as a refrigerator, a garage door, etc. The messages 570 transmitted between the virtual assistant device 110 and the multiple devices 572 can operate according to an Internet-of-Things (IoT) configuration. For example, the virtual assistant device 110 can send messages 570 to at least one device of the multiple devices 572 to control operation of the at least one device.

The GUI 504 is configured to display data associated with the multiple devices 572 on the screen 120. For example, in the illustrative example of FIG. 5, the GUI 504 displays data 520 (e.g., graphical data) associated with the television 560, data 522 associated with the air conditioning system 562, data 524 associated with the lighting device 564, data 526 associated with the robot vacuum device 566, and data 528 associated with the speaker 568. For each device 572, the GUI 504 illustrates a label and at least one control input. As a non-limiting example, the GUI 504 illustrates a label 574 for the television 560 and control inputs 576 for the television 560. The control inputs 576 include a volume control input, a channel control input, and a timer control input. As another non-limiting example, the GUI 504 illustrates a label 578 for the air conditioning system 562 and control inputs 580 for the air conditioning system 562. The control inputs 580 include a temperature control input, a fan control input, and a timer control input. As another non-limiting example, the GUI 504 illustrates a label 582 for the lighting device 564 and control inputs 584 for the lighting device 564. The control inputs 584 include a color control input and a timer control input.

The GUI 504 is configured to provide feedback 540 to the user 102 indicating that the virtual assistant device 110 does not recognize a verbal command from the user 102 as being associated with an action to be performed (e.g., an instruction to be sent to one or more of the multiple devices 572). For example, if a verbal command is not recognized by the virtual assistant device 110 such that a vector associated with the verbal command differs from each of the stored vectors 144 by at least the difference constraint 148, the GUI 504 can provide the feedback 540. In the illustrative example of FIG. 5, the feedback 540 includes the phrase "The verbal command is not recognized." Thus, the feedback 540 indicates that the verbal command is not recognized as being associated with an action to be performed.

The GUI 504 is also configured to provide an instruction 542 for the user 102 on how to teach the processor 112 which action is to be performed in response to receiving the verbal command. In the example of FIG. 5, the instruction 542 includes the phrase "Please select a device, an action, and a variable amount to teach me how to respond to the verbal command." In response to reading the instruction 542, the user 102 can interact with the GUI 504 to teach the virtual assistant device 110 which action is to be performed in response to the verbal command. To illustrate, the GUI 504 includes a "device" selection control 530 and an "action" selection control 532 that enables the user 102 to select an action to be performed by the selected device. The GUI 504 also includes a "variable" control 534 that enables the user 102 to enter or select a value, such as a temperature selection, a fan level selection, a volume level selection, a timer stop or start value, etc. If the unrecognized command was "set temperature to 24 degrees," and the user 102 has selected "Air Conditioner" in the device selection control 530, "Set degree" in the action selection control 532, and the value "24" in the variable control 534, the user 102 can teach the virtual assistant device 110 to map the sentence "set temperature to 24 degrees" to set the temperature of the AC 562 to 24 degrees. Thus, the next time the virtual assistant device 110 receives the command "set temperature to 24 degrees," the GUI 504 can send a message 570 to the air conditioning system 562 to adjust the temperature.

Thus, the GUI 504 is configured to map one or more sentences to actions associated with controlling each of the devices 560-568 in the multiple devices 572 based on the user manipulating user interface controls that are associated with the sentences and that are illustrated on the GUI 504. Although the instruction 542 is illustrated in FIG. 5, in other implementations, the GUI 504 can illustrate the prompt 352 of FIG. 4 or other instructions to instruct the user 102 how to teach the virtual assistant device 110 which action is to be performed in response to the verbal command.

Thus, the GUI 504 provides an interface (e.g., the instruction 542 and the controls 530-534) to teach the virtual assistant device 110 how to map one or more sentences to desired actions associated with controlling one or more of the devices 560-568 of the multiple devices 572. The teaching, by the user, for the virtual assistant device 110 to map a sentence to an action is based on the use of the screen 502 and the controls 530-534. Although described in conjunction with the virtual assistant device 110 of FIG. 1, the GUI 504 can be used with other implementations of a virtual assistant device that may differ from the virtual assistant device 110. For example, the GUI 504 can be used with a virtual assistant device that uses different techniques to determine whether the verbal command 104 is associated with an action.

Although the instruction 542 is illustrated as text displayed on the screen 120, in other implementations the instruction 542 is provided via one or more other techniques, such as a verbal instruction output by a speaker of the device 110, as an illustrative, non-limiting example. Although the GUI 504 is illustrated as including the controls 530-534 to receive user input, in other implementations one or more of the device selection, the action selection, and the variable amount can be input via one or more other techniques, such as by receiving speech input spoken by a user, recognition of a gesture made by the user, or by receiving one or more messages 570 indicating a user interaction with one or more of the devices 572 (e.g., actual control of the targeted device(s) 560-568 to demonstrate the user's intent of the unrecognized verbal command).

Figure 6:
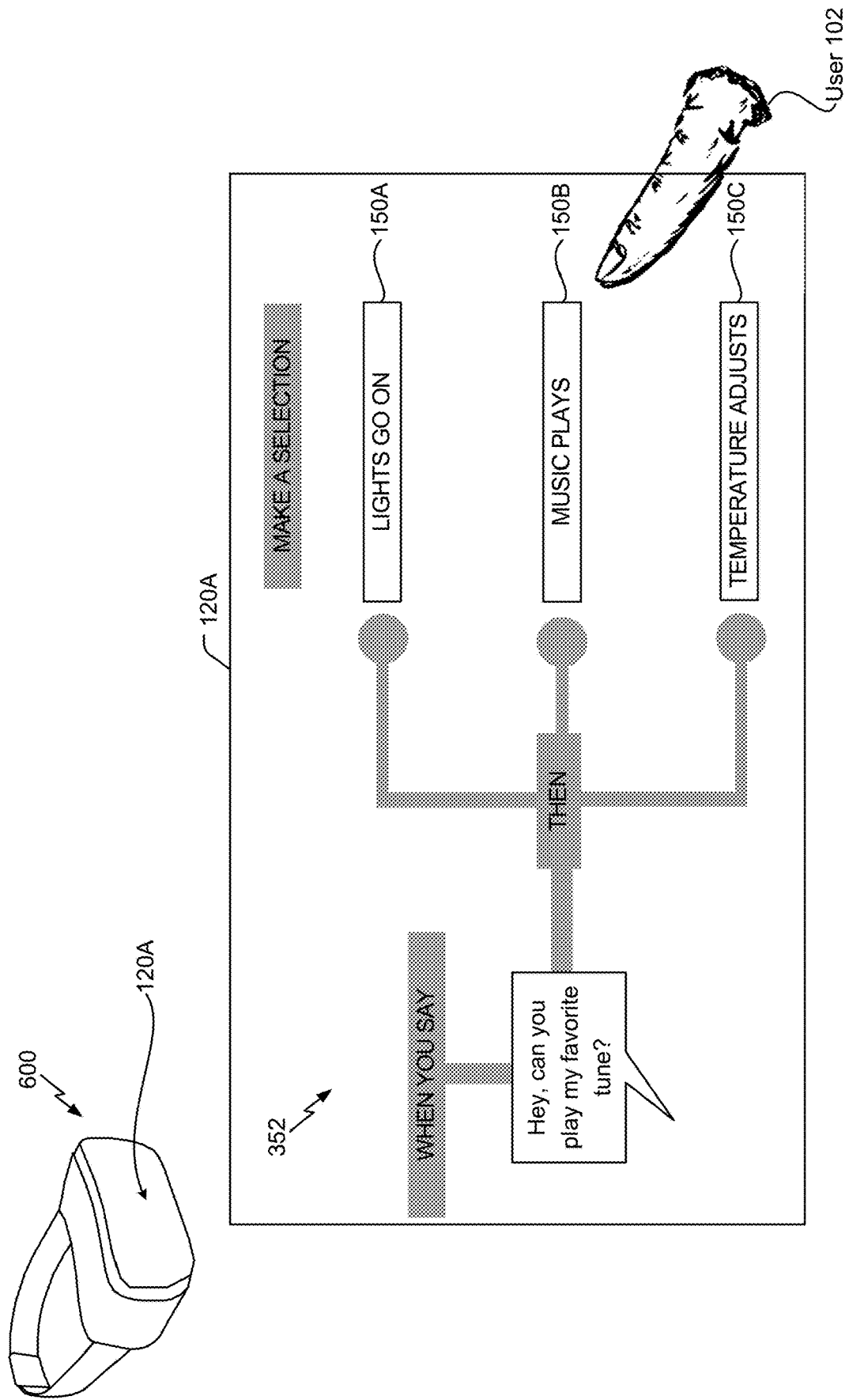
FIG. 6 is an illustrative example of a wearable device that incorporates aspects of a virtual assistant device.

FIG. 6 is an illustrative example of a wearable device 600. The wearable device 600 includes a screen 120A that enables a user to teach the virtual assistant device 110 which action is to be performed in response to receiving a verbal command. According to one implementation, the screen 120A corresponds to the screen 120. In the illustrated example of FIG. 6, the wearable device 600 can be a virtual reality headset, an augmented reality headset, or a mixed reality headset. The virtual assistant device 110 can be integrated in wearable device 600 or coupled to the wearable device 600 (e.g., in another wearable device or in a mobile device that interacts with the wearable device 600).

The screen 120A displays the prompt 352 illustrated in FIG. 4. The user 102 can select the second action 150B (e.g. "music plays") in response to receiving the prompt 352, and the virtual assistant device 110 can store the vector 342 associated with the verbal command 304 in the database 118 and can associate the second action 150B with the vector. As a result, after receiving the user selection, the virtual assistant device 110 (e.g., the action initiator 138) can initiate the second action 150B in response to receiving the verbal command 304 again or receiving a verbal command that produces a vector that is similar to the vector 342.

Thus, the techniques described with respect to FIG. 6 enables the user 102 to teach the virtual assistant device 110 to dynamically associate unrecognized spoken commands with user actions through use of user interaction with the prompt 352 displayed at the screen 120A of the wearable device 600.

Figure 7:
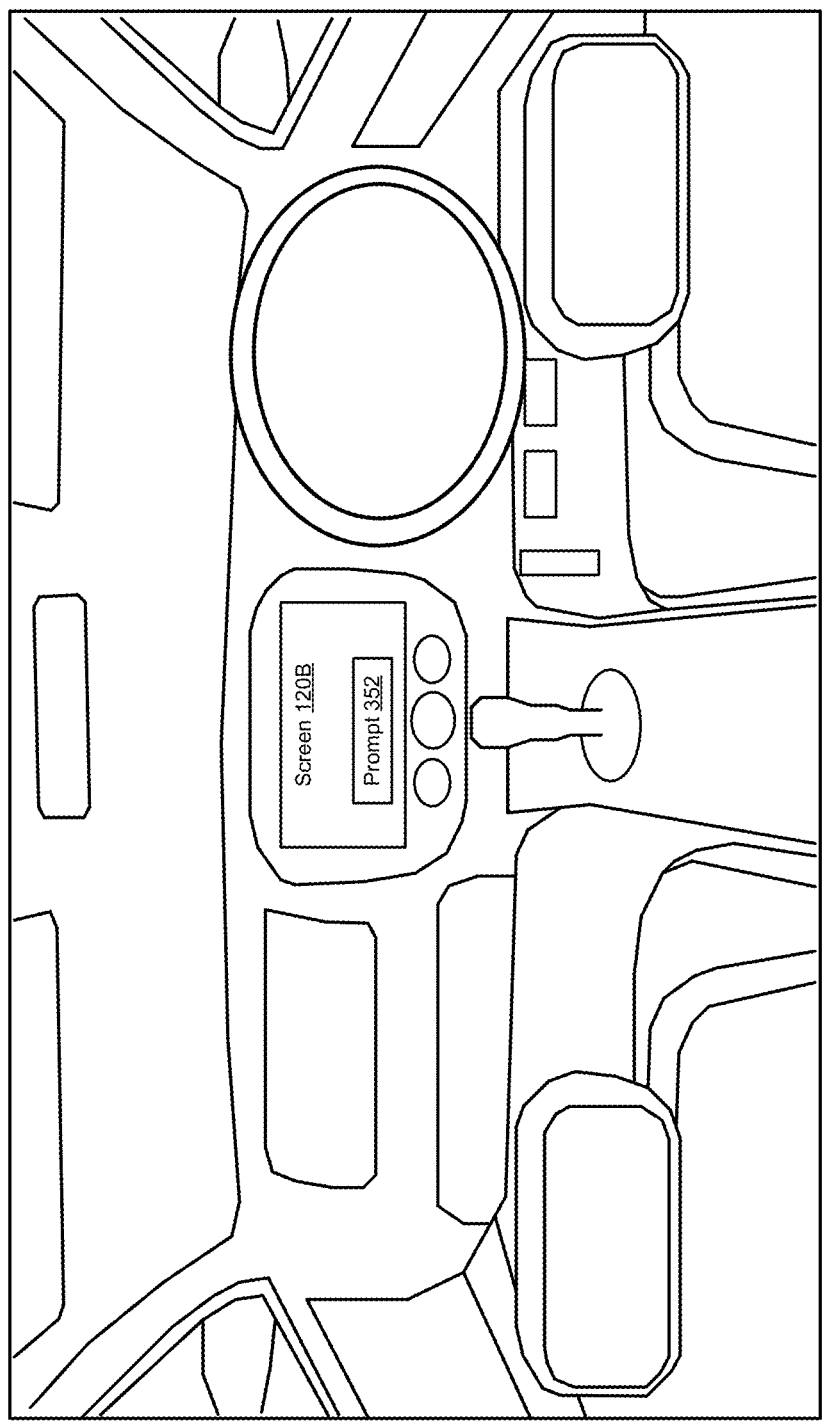
FIG. 7 is an illustrative example of a vehicle that incorporates aspects of a virtual assistant device.

FIG. 7 is an illustrative example of a vehicle 700. According to one implementation, the vehicle 700 is a self-driving car. According to other implementations, the vehicle 700 can be a car, a truck, a motorcycle, an aircraft, a water vehicle, etc. The vehicle 700 includes a screen 120B that enables a user to teach the virtual assistant device 110 which action is to be performed in response to receiving a verbal command. According to one implementation, the screen 120B corresponds to the screen 120. The virtual assistant device 110 can be integrated in the vehicle 700 or coupled to the vehicle 700.

The screen 120B can be configured to display the prompt 352 illustrated in FIG. 4. The user 102 (e.g., a driver of the vehicle 700) can select the second action 150B (e.g. "music plays") in response to receiving the prompt 352, and the virtual assistant device 110 can store the vector 342 associated with the verbal command 304 in the database 118 and can associate the second action 150B with the vector. As a result, after receiving the user selection, the virtual assistant device 110 (e.g., the action initiator 138) can initiate the second action 150B in response to receiving the verbal command 304 again or receiving a verbal command that produces a vector that is similar to the vector 342.

Thus, the techniques described with respect to FIG. 7 enables the user 102 to teach the virtual assistant device 110 to dynamically associate unrecognized spoken commands with user actions through use of user interaction with the prompt 352 displayed at the screen 120B of the vehicle 700.

Figure 8:
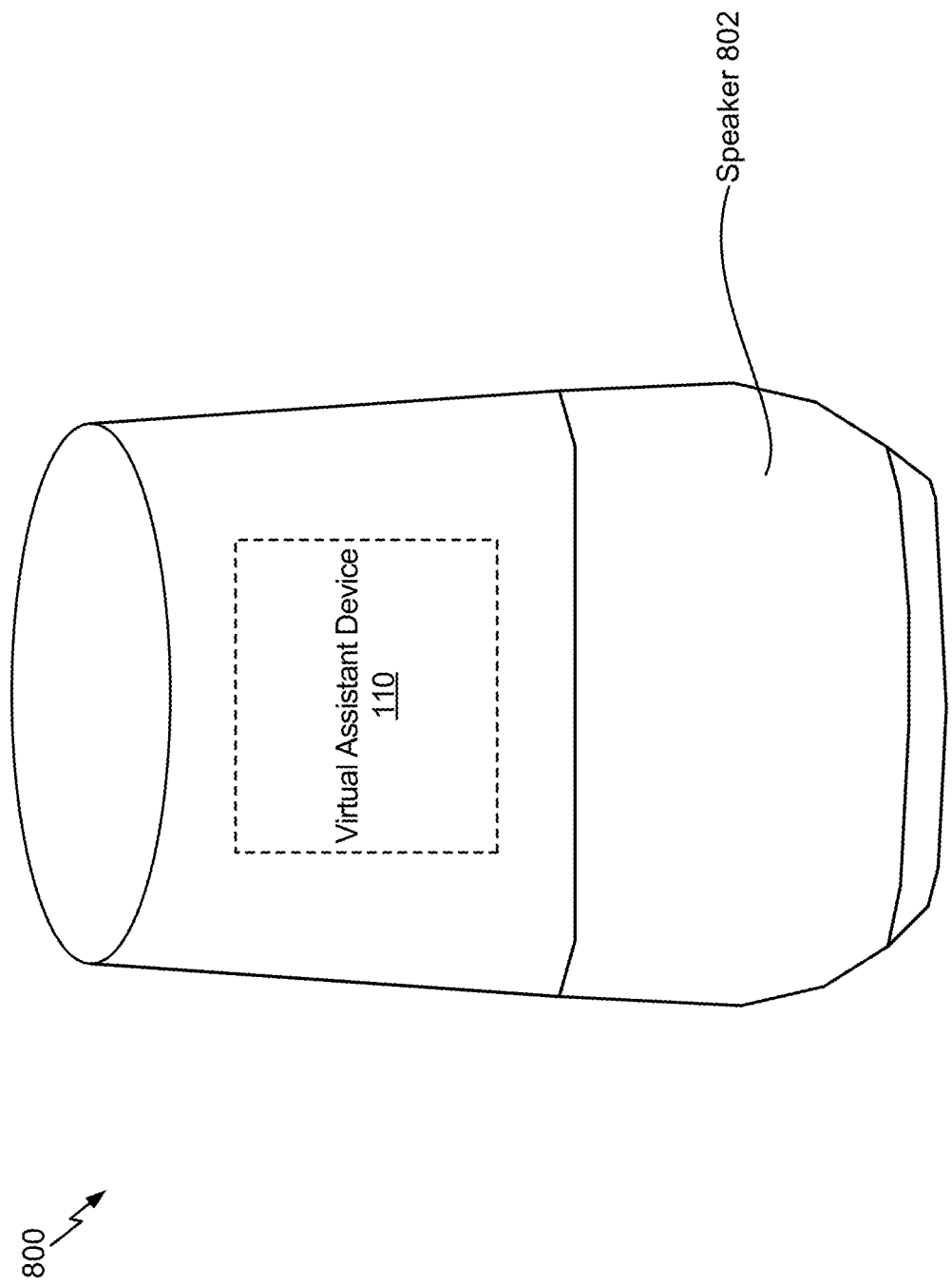
FIG. 8 is an illustrative example of a voice-controlled speaker system that incorporates aspects of a virtual assistant device.

FIG. 8 is an illustrative example of a voice-controlled speaker system 800. The voice-controlled speaker system 800 can have wireless network connectivity and is configured to execute an assistant operation. The virtual assistant device 110 is included in the voice-controlled speaker system 800. The voice-controlled speaker system 800 also includes a speaker 802. During operation, in response to receiving a verbal command, the voice-controlled speaker system 800 can execute assistant operations. The assistant operations can include adjusting a temperature, playing music, turning on lights, etc. In some implementations, the virtual assistant device 110 can instruct the user 102 how to train the virtual assistant device 110 to respond to an unrecognized command. For example, virtual assistant device 110 can provide a GUI, such as the GUI 504, or verbal interactions to instruct the user 102 how to train the virtual assistant device 110.

Figure 9:
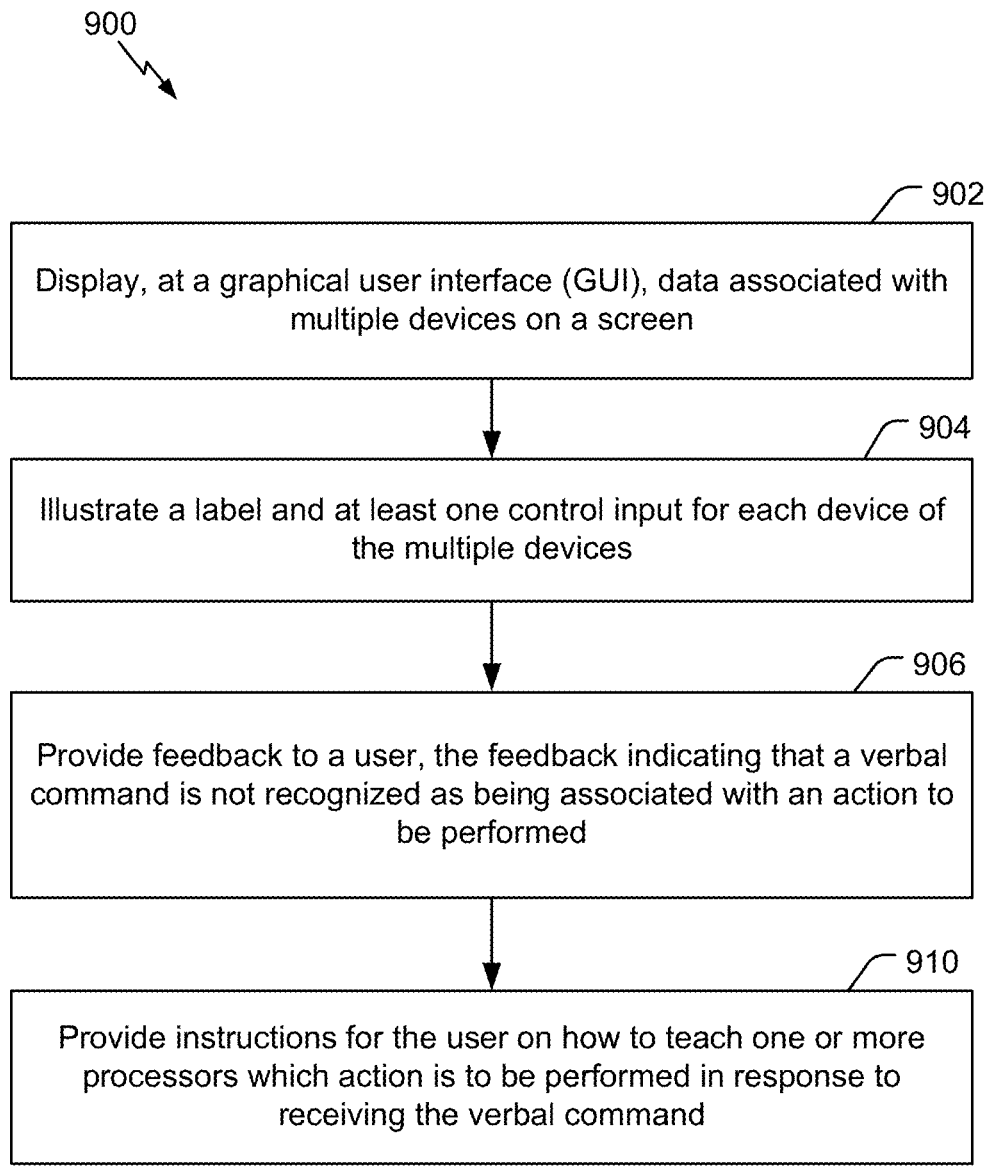
FIG. 9 is a flowchart of a method of teaching a virtual assistant device an action to be performed in response to receiving a command.

Referring to FIG. 9, a flowchart of a method 900 of teaching a virtual assistant device an action to be performed in response to receiving a command is shown. The method 900 can be performed by the virtual assistant device 110, the GUI 504, the wearable device 600, the vehicle 700, the voice-controlled speaker system 800, or a combination thereof.

The method 900 includes displaying, at a GUI, data associated with multiple devices on a screen, at 902. For example, in the illustrative example of FIG. 5, the GUI 504 displays the data 520 associated with the television 560, the data 522 associated with the air conditioning system 562, the data 524 associated with the lighting device 564, the data 526 associated with the robot vacuum device 566, and the data 528 associated with the speaker 568.

The method 900 also includes illustrating a label and at least one control input for each device of the multiple devices, at 904. For example, for each device 572, the GUI 504 illustrates a label and at least one control input. As a non-limiting example, the GUI 504 illustrates the label 574 for the television 560 and the control inputs 576 for the television 560. The control inputs 576 include a volume control input, a channel control input, and a timer control input. As another non-limiting example, the GUI 504 illustrates the label 578 for the air conditioning system 562 and the control inputs 580 for the air conditioning system 562. The control inputs 580 include a temperature control input, a fan control input, and a timer control input. As another non-limiting example, the GUI 504 illustrates the label 582 for the lighting device 564 and the control inputs 584 for the lighting device 564. The control inputs 584 include a color control input and a timer control input.

The method 900 further includes providing feedback to a user, at 906. The feedback indicates that a verbal command is not recognized as being associated with an action to be performed. For example, the GUI 504 provides the feedback 540 to the user 102 indicating that the virtual assistant device 110 does not recognize a verbal command from the user 102 as being associated with an action to be performed (e.g., an instruction to be sent to one or more of the multiple devices 572). In the illustrative example of FIG. 5, the feedback 540 includes the phrase "The verbal command is not recognized." Thus, the feedback 540 indicates that the verbal command is not recognized as being associated with an action to be performed.

The method 900 further includes providing instructions for the user to teach one or more processors which action is to be performed in response to receiving the verbal command, at 910. For example, the GUI 504 provides the instruction 542 for the user 102 on how to teach the processor 112 which action is to be performed in response to receiving the verbal command. In the example of FIG. 5, the instruction 542 includes the phrase "Please select a device, an action, and a variable amount to teach me how to respond to the verbal command." In response to reading the instruction 542, the user 102 can interact with the GUI 504 to teach the virtual assistant device 110 which action is to be performed in response to the verbal command.

To illustrate, after providing the instructions for the user, the method 900 can also include receiving an input from the user indicating which action is to be performed, storing data associating the verbal command with the action, and sending a message to one or more of the multiple devices, the message indicating a command to perform the action. For example, the virtual assistant device 110 can receive, via the GUI 504, user input selecting the television 560, such as via interacting with the controls 530-534 to designate the television 560 as the device, "set volume" as the action, and "50%" as the variable. The virtual assistant device 110 can add the vector 142 to the stored vectors 144 and associate the vector 142 with the indicated action (e.g., adjust television volume to 50%) to enable the spoken command (and near variants of the spoken command) to be recognized. In addition, the virtual assistant device 110 can send a message 570 to the television 560, indicating a command to perform the action (e.g., adjust volume to 50%).

According to one implementation, the method 900 includes receiving an audio signal corresponding to a verbal command. For example, the microphone 114 captures the verbal command 104 and generates the audio signal 124 that corresponds to the verbal command 104. The processor 112 receives the audio signal 124 that corresponds to the verbal command 104.

According to one implementation, the method 900 also includes processing the audio signal to generate a vector associated with the verbal command. For example, the processor 112 processes the audio signal 124 to generate the vector 142 associated with the verbal command 104. According to one implementation of the method 900, processing the audio signal includes performing an automatic speech recognition operation on the audio signal to generate a word sequence corresponding to the verbal command. For example, the automatic speech recognizer 130 performs the automatic speech recognition operation on the audio signal 124 to generate the word sequence 140 that corresponds to the verbal command 104. According to one implementation of the method 900, processing the audio signal also includes performing a sentence embedding operation on the word sequence to generate the vector. For example, the sentence embedder 132 performs the sentence embedding operation on the word sequence 140 to generate the vector 142.

According to one implementation, the method 900 also includes, in response to a determination that the vector does not match any stored vector of one or more stored vectors associated with respective actions, identifying a particular stored vector of the one or more stored vectors at least partially based on a difference between the vector and the particular stored vector. For example, the vector search engine 134 determines whether the vector 142 matches any stored vector 144 of one or more stored vectors 144. In response to a determination that vector 142 does not match any stored vector 144, the vector search engine 134 identifies the stored vector 144A at least partially based on the difference between the vector 142 and the particular stored vector 144A. According to one implementation, the difference includes a Euclidean distance.

According to one implementation, the method 900 can include computing difference values between the vector and multiple stored vectors of the one or more stored vectors. To illustrate, the vector search engine 134 computes difference values between the vector 142 and multiple stored vectors 144A, 144B, 144C of the one or more stored vectors 144 in the database 118. The method 900 can also include selecting a stored vector associated with a smallest computed difference value of the difference values. To illustrate, the vector search engine 134 selects the stored vector 144 associated with the smallest computed difference value of the difference values. The difference value between the vector 142 and the stored vector 144A is relatively small because the associated phrases of the vectors 142, 144A are relatively similar. However, the difference values between the vector 142 and the stored vectors 144B, 144C are relatively large because the associated phrases of the vectors 144B, 144C are not similar to the phrase (e.g., "Hey, can you turn the lights on?") associated with the vector 142. Thus, the vector search engine 134 selects the stored vector 144A because the stored vector 144A is associated with the smallest computed difference value.

The method 900 can also include sending messages to the multiple devices and receiving messages from the multiple devices. For example, the sent messages can include an instruction that is sent to one or more of the multiple devices 572, and the received messages can include one or more status updates provided by one or more of the multiple devices 572. According to one implementation, the method 900 includes initiating performance of a particular action that is associated with the particular stored vector in response to a determination that the difference between the vector and the particular stored vector satisfies a difference constraint. For example, the action initiator 138 initiates performance of the action 150A associated with the stored vector 144A in response to the difference between the vector 142 and the stored vector 144A satisfying the difference constraint 148. Thus, according to the scenario described above, the action initiator 138 can initiate turning on the lights (e.g., the action 150A) in response to the difference between the vector 142 and the stored vector 144A satisfying the difference constraint 148.

The method 900 enables a slightly different version of a stored command, associated with a particular action, to be executed without additional ontology design. For example, when the received verbal command is sufficiently different from other trained commands, the virtual assistant device 110 can generate a prompt (e.g., instructions) for the user 102 to teach the virtual assistant device 110 which action is to be performed in response to receiving the verbal command. As a result, the GUI guides the user through an updating process, enabling the user to teach the virtual assistant device how to interpret the unidentified verbal command for the present occurrence and future occurrences of receiving the verbal command.

In some implementations, using sentence embedding to generate the vector 142 and comparison of a resulting vector to stored vectors enables the virtual assistant device 110 to select an action to be performed based on a similarity of a command spoken by the user 102 to a previously enrolled command (represented by a vector in the stored vectors 144). Thus, the virtual assistant device 110 provides robust command recognition and a mechanism to personalize the virtual assistant device 110 by adding vector/action pairs to the stored vectors 144.

Although FIGS. 1-9 describe implementations in which a GUI is used to present data representing aspects of controllable devices, in other implementations non-graphical interface elements can be used. For example, in a vehicle implementation, device status information can be presented audibly to an operator of the vehicle to prevent the operator from having to view a visual display. Similarly, user input mechanisms such as speech recognition or gesture recognition can be used as illustrative, non-limiting alternatives to a touchscreen, keyboard, or keypad input device. In some implementations, the virtual assistant device may be implemented without a display.

Figure 10:
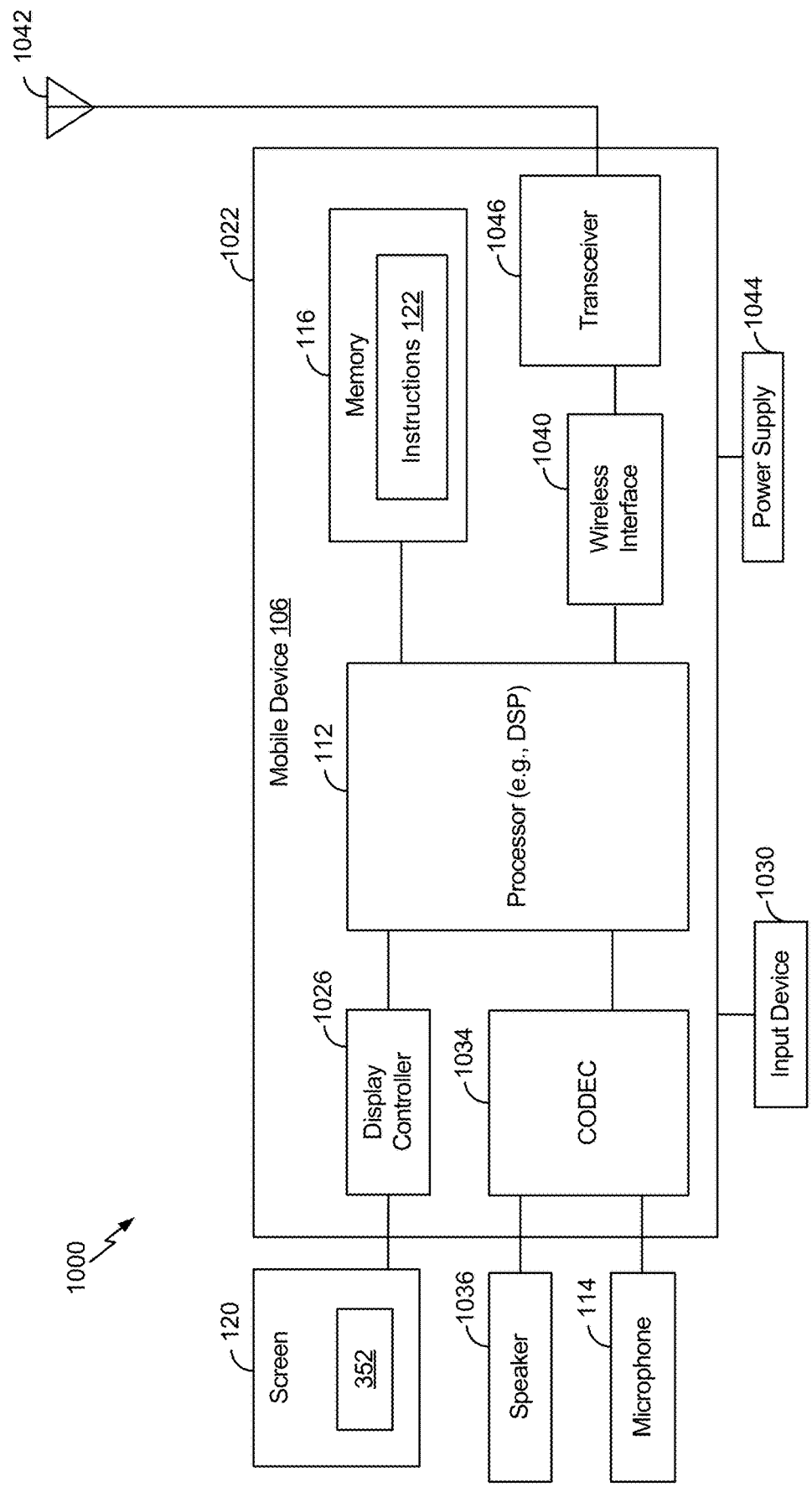
FIG. 10 is a block diagram of a particular illustrative example of a device that is operable to perform the techniques described with reference to FIGS. 1-9.

Referring to FIG. 10, a block diagram of a device 1000 is shown. According to one implementation, the device 1000 is a wireless communication device. In a particular implementation, the device 1000 includes the processor 112, such as a central processing unit (CPU) or a digital signal processor (DSP), coupled to the memory 116. The memory 116 includes the instructions 122 (e.g., executable instructions) such as computer-readable instructions or processor-readable instructions. The instructions 122 include one or more instructions that are executable by a computer, such as the processor 112, to perform the operations described with respect to FIGS. 1-9.

The device 1000 also includes a display controller 1026 that is coupled to the processor 112 and to the screen 120 (e.g., a display device). According to one implementation, the screen 120 can display the prompt 352. According to another implementation, the screen 120 can display GUI 504. A coder/decoder (CODEC) 1034 is also coupled to the processor 112. A speaker 1036 and the microphone 114 are coupled to the CODEC 1034. A wireless interface 1040 is coupled to the processor 112, and an antenna 1042 is coupled to the wireless interface 1040 via a transceiver 1046.

In some implementations, the processor 112, the display controller 1026, the memory 116, the CODEC 1034, the wireless interface 1040, and the transceiver 1046 are included in a system-in-package or system-on-chip device 1022. In some implementations, a power supply 1044 and an input device 1030 are coupled to the system-on-chip device 1022. Moreover, in a particular implementation, as illustrated in FIG. 10, the screen 120, the microphone 114, the speaker 1036, the antenna 1042, and the power supply 1044 are external to the system-on-chip device 1022.

In a particular implementation, one or more components of the systems and devices disclosed herein is integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, a vehicle, a headset, a "smart speaker" device, or another type of device.

In conjunction with the described techniques, an apparatus includes means for receiving an audio signal corresponding to a verbal command. For example, the means for receiving may include the processor 112, the automatic speech recognizer 130, one or more other devices, circuits, modules, or any combination thereof.

The apparatus also includes means for processing the audio signal to generate a vector associated with the verbal command. For example, the means for processing may include the processor 112, the automatic speech recognizer 130, the sentence embedder 132, one or more other devices, circuits, modules, or any combination thereof.

The apparatus also includes means for storing one or more vectors that are associated with respective actions. The means for storing may include the database 118, one or more other devices, circuits, modules, or any combination thereof.

The apparatus also includes means for identifying a particular stored vector from the means for storing. The particular stored vector is identified at least partially based on a difference between the vector and the particular stored vector, and the particular stored vector is identified in response to a determination that the vector does not match any stored vector from the means for storing. The means for identifying may include the processor 112, the vector search engine 134, one or more other devices, circuits, modules, or any combination thereof.

The apparatus also includes means for initiating performance of a particular action that is associated with the particular stored vector in response to a determination that the difference between the vector and the particular stored vector satisfies a difference constraint. For example, the means for initiating may include the processor 112, action initiator 138, one or more other devices, circuits, modules, or any combination thereof.

In conjunction with the described techniques, a device includes a device interface that is configured to send and receive messages from multiple devices. The device also includes a user interface configured to map one or more sentences to actions associated with controlling each of the devices of the multiple devices based on manipulating user interface controls that are associated with the sentences and that are illustrated on the user interface.

In conjunction with the described techniques, a device includes a touchscreen and a processor configured to provide, at the touchscreen, a GUI configured to display controls corresponding to multiple devices. The GUI is also configured to provide an interface to display instructions for mapping one or more sentences to actions associated with controlling each of the devices of the multiple devices. The instructions are based on the use of the touchscreen to map the sentences to the actions.

In conjunction with the described techniques, a virtual assistant device is configured to give feedback to a user. The feedback indicates that the virtual assistant device does not recognize a verbal command as being associated with an action to be performed. In response to not recognizing the verbal command as being associated with an action to be performed, the virtual assistant device is configured to ask the user to teach the virtual assistant device to associate the verbal command with a desired action to control one of a plurality of devices in direct communication with the virtual assistant device.

In conjunction with the described techniques, a virtual assistant device includes a command interpreter configured to perform speech recognition that includes processing an audio signal corresponding to a verbal command to generate a vector. The command interpreter is also configured to, in response to the vector not matching any stored vector, identify a stored vector at least partially based on a difference between the vector and the stored vector. The command interpreter is further configured to, in response to the difference between the vector and the identified stored vector satisfying a difference constraint, initiate an action associated with the identified stored vector.

In conjunction with the described techniques, a device includes a memory and one or more processors coupled to the memory. The one or more processors are configured to receive an audio signal corresponding to a verbal command. The one or more processors are configured to process the audio signal to generate a vector associated with the verbal command. The one or more processors are configured to, in response to a determination that the vector does not match any stored vector of one or more vectors associated with respective actions, identify a particular stored vector of the one or more stored vectors at least partially based on a difference between the vector and the particular stored vector. The one or more processors are also configured to initiate performance of a particular action that is associated with the particular stored vector in response to a determination that the difference between the vector and the particular stored vector satisfy a difference constraint.

In conjunction with the described techniques, a method of determining an action to be associated with a verbal command includes receiving an audio signal corresponding to the verbal command. The method also includes processing the audio signal to generate a vector associated with the verbal command. Responsive to the vector not matching any stored vector of one or more stored vectors that are associated with respective actions, the method includes identifying a particular stored vector of the one or more stored vectors at least partially based on a difference between the vector and the particular stored vector. The method also includes, in response to the difference between the vector and the particular stored vector satisfying a difference constraint, initiating performance of a particular action that is associated with the particular stored vector.

In conjunction with the described techniques, a non-transitory computer-readable medium includes instructions for determining an action to be associated with a verbal command. The instructions, when executed by one or more processors, cause the one or more processors to receive an audio signal corresponding to the verbal command. The instructions, when executed by the one or more processors, also cause the one or more processors to process the audio signal to generate a vector associated with the verbal command. The instructions, when executed by the one or more processors, also cause the one or more processors to, in response to a determination that the vector does not match any stored vector of one or more stored vectors associated with respective actions, identify a particular stored vector of the one or more stored vectors at least partially based on a difference between the vector and the particular stored vector. The instructions, when executed by the one or more processors, also cause the one or more processors to initiate performance of a particular action that is associated with the particular stored vector in response to a determination that the difference between the vector and the particular stored vector satisfy a difference constraint.

In accordance with one or more techniques of this disclosure, the virtual assistant device 110 may be used to acquire a sound field. For instance, the virtual assistant device 110 may acquire a sound field via the wired and/or wireless acquisition devices and/or the on-device surround sound capture (e.g., a plurality of microphones integrated into the virtual assistant device 110). The virtual assistant device 110 may then code the acquired sound field into the Higher Order Ambisonic (HOA) coefficients for playback by one or more of the playback elements. For instance, the user 102 of the virtual assistant device 110 may record (acquire a sound field of) a live event (e.g., a meeting, a conference, a play, a concert, etc.), and code the recording into HOA coefficients.

The virtual assistant device 110 may also utilize one or more of the playback elements to playback the HOA coded sound field. For instance, the virtual assistant device 110 may decode the HOA coded sound field and output a signal to one or more of the playback elements that causes the one or more of the playback elements to recreate the sound field. As one example, the virtual assistant device 110 may utilize the wireless and/or wireless communication channels to output the signal to one or more speakers (e.g., speaker arrays, sound bars, etc.). As another example, the virtual assistant device 110 may utilize docking solutions to output the signal to one or more docking stations and/or one or more docked speakers (e.g., sound systems in smart cars and/or homes). As another example, the virtual assistant device 110 may utilize headphone rendering to output the signal to a set of headphones, e.g., to create realistic binaural sound.

Yet another context in which the techniques may be performed includes an audio ecosystem that may include audio content, game studios, coded audio content, rendering engines, and delivery systems. In some examples, the game studios may include one or more digital audio workstations (DAWs) which may support editing of HOA signals. For instance, the one or more DAWs may include HOA plugins and/or tools which may be configured to operate with (e.g., work with) one or more game audio systems. In some examples, the game studios may output new stem formats that support HOA. In any case, the game studios may output coded audio content to the rendering engines which may render a sound field for playback by the delivery systems.

The virtual assistant device 110 may also, in some instances, include a plurality of microphones that are collectively configured to record a 3D sound field. In other words, the plurality of microphone may have X, Y, Z diversity. In some examples, the virtual assistant device 110 may include a microphone which may be rotated to provide X, Y, Z diversity with respect to one or more other microphones of the virtual assistant device 110.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a rendered to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components or modules. This division of components and modules is for illustration only. In an alternate implementation, a function performed by a particular component or module may be divided amongst multiple components or modules. Moreover, in an alternate implementation, two or more components or modules may be integrated into a single component or module. Each component or module may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
a memory configured to store instructions; and
one or more processors coupled to the memory and configured to execute the instructions to:
display data associated with multiple devices on a screen;
illustrate a label and at least one control input for each device of the multiple devices;
receive an audio signal corresponding to a modified version of a verbal command;
perform an automatic speech recognition operation on the audio signal to generate a word sequence corresponding to the modified version of the verbal command;
perform a sentence embedding operation on the word sequence to generate a vector, wherein the sentence embedding operation is based on Bidirectional encoder representations from transformers (BERT);
provide feedback to a user, the feedback indicating that the modified version of the verbal command is not recognized as being associated with an action to be performed;
provide instructions for the user on how to teach the one or more processors which action associated with the at least one control input for each device of the multiple devices is to be performed in response to receiving the modified version of the verbal command; and
receive user input to dynamically associate the modified version of the verbal command, based on the sentence embedding operation, with the at least one control input for each device of the multiple devices through use of user interaction displayed on the screen.

2. The device of claim 1, wherein the one or more processors are configured to execute the instructions to:
in response to a determination that the vector does not match any stored vector of one or more stored vectors associated with respective actions, identify a most similar stored vector of the one or more stored vectors at least partially based on a difference between the vector and the most similar stored vector; and
determine that the verbal command is not recognized as being associated with an action to be performed in response to the difference not satisfying a difference constraint.

3. The device of claim 2, further comprising a microphone coupled to the one or more processors, the microphone configured to:
capture the modified version of the verbal command; and
generate the audio signal based on the modified version of the verbal command.

4. The device of claim 2, wherein the difference comprises a Euclidean distance.

5. The device of claim 2, wherein, to identify the most similar stored vector, the one or more processors are configured to execute the instructions to:
compute difference values between the vector and multiple stored vectors of the one or more stored vectors; and
select a stored vector associated with a smallest computed difference value of the difference values, the most similar stored vector corresponding to the selected stored vector.

6. The device of claim 1, further comprising a voice-controlled speaker system that has a wireless network connectivity and that is configured to execute an assistant operation, wherein the screen and the one or more processors are integrated into the voice-controlled speaker system.

7. The device of claim 1, further comprising a wearable device, wherein the screen and the one or more processors are integrated into the wearable device.

8. The device of claim 7, wherein the wearable device comprises a virtual reality headset, a mixed reality headset, or an augmented reality headset.

9. The device of claim 1, further comprising a vehicle, wherein the screen and the one or more processors are integrated into the vehicle.

10. The device of claim 1, further comprising a device interface coupled to the one or more processors, the device interface configured to:
send messages to the multiple devices; and
receive messages from the multiple devices.

11. The device of claim 1, wherein the multiple devices comprise at least one of a television, an air conditioning system, a lighting device, a vacuum device, or a speaker.

12. A method of teaching a virtual assistant device an action to be performed in response to receiving a verbal command, the method comprising:
displaying, at a graphical user interface (GUI), data associated with multiple devices on a screen;
illustrating a label and at least one control input for each device of the multiple devices;
receiving an audio signal corresponding to a modified version of the verbal command;
performing an automatic speech recognition operation on the audio signal to generate a word sequence corresponding to the modified version of the verbal command;
performing a sentence embedding operation on the word sequence to generate a vector, wherein the sentence embedding operation is based on Bidirectional encoder representations from transformers (BERT);
providing feedback to a user, the feedback indicating that the modified version of the verbal command is not recognized as being associated with an action to be performed;
providing instructions for the user on how to teach one or more processors which action associated with the at least one control input for each device of the multiple devices is to be performed in response to receiving the modified version of the verbal command; and
receiving user input to dynamically associate the modified version of the verbal command, based on the sentence embedding operation, with the at least one control input for each device of the multiple devices through use of user interaction displayed on the screen.

13. The method of claim 12, further comprising:
storing data associating the modified version of the verbal command with the action; and
sending a message to one or more of the multiple devices, the message indicating the modified version of the verbal command to perform the action.

14. The method of claim 12, further comprising:
in response to a determination that the vector does not match any stored vector of one or more stored vectors associated with respective actions, identifying a most similar stored vector of the one or more stored vectors at least partially based on a difference between the vector and the most similar stored vector; and
determining that the modified version of the verbal command is not recognized as being associated with an action to be performed in response to the difference not satisfying a difference constraint.

15. The method of claim 14, wherein the difference comprises a Euclidean distance.

16. The method of claim 14, wherein identifying the most similar stored vector comprises:
computing difference values between the vector and multiple stored vectors of the one or more stored vectors; and
selecting a stored vector associated with a smallest computed difference value of the difference values, the most similar stored vector corresponding to the selected stored vector.

17. The method of claim 12, wherein providing the instructions for the user is performed by a mobile device.

18. The method of claim 12, wherein providing the instructions for the user is performed by a voice-controlled speaker system that has a wireless network connectivity and that is configured to execute an assistant operation.

19. The method of claim 12, wherein providing the instructions for the user is performed by a wearable device.

20. The method of claim 19, wherein the wearable device comprises a virtual reality headset, a mixed reality headset, or an augmented reality headset.

21. A non-transitory computer-readable medium comprising instructions for teaching a virtual assistant device an action to be performed in response to receiving a verbal command, the instructions, when executed by one or more processors, cause the one or more processors to:
display, at a graphical user interface (GUI), data associated with multiple devices on a screen;
illustrate a label and at least one control input for each device of the multiple devices;
receive an audio signal corresponding to a modified version of the verbal command;
perform an automatic speech recognition operation on the audio signal to generate a word sequence corresponding to the modified version of the verbal command;
perform a sentence embedding operation on the word sequence to generate a vector, wherein the sentence embedding operation is based on Bidirectional encoder representations from transformers (BERT);
provide feedback to a user, the feedback indicating that a modified version of the verbal command is not recognized as being associated with an action to be performed;
provide instructions for the user on how to teach the one or more processors which action associated with the at least one control input for each device of the multiple devices is to be performed in response to receiving the modified version of the verbal command; and
receive user input to dynamically associate the modified version of the verbal command, based on the sentence embedding operation, with the at least one control input for each device of the multiple devices through use of user interaction displayed on the screen.

22. The non-transitory computer-readable medium of claim 21, wherein the instructions, when executed by the one or more processors, further cause the one or more processors to:
in response to a determination that the vector does not match any stored vector of one or more stored vectors associated with respective actions, identify a most similar stored vector of the one or more stored vectors at least partially based on a difference between the vector and the most similar stored vector; and
determine that the modified version of the verbal command is not recognized as being associated with an action to be performed in response to the difference not satisfying a difference constraint.

23. The non-transitory computer-readable medium of claim 21, wherein the multiple devices comprise at least one of a television, an air conditioning system, a lighting device, a vacuum device, or a speaker.

24. An apparatus comprising:
means for displaying data associated with multiple devices on a screen;
means for illustrating a label and at least one control input for each device of the multiple devices;
means for receiving an audio signal corresponding to a modified version of a verbal command;
means for performing an automatic speech recognition operation on the audio signal to generate a word sequence corresponding to the modified version of the verbal command;
means for performing a sentence embedding operation on the word sequence to generate a vector, wherein the sentence embedding operation is based on Bidirectional encoder representations from transformers (BERT);
means for providing feedback to a user, the feedback indicating that the modified version of the verbal command is not recognized as being associated with an action to be performed;
means for providing instructions for the user on how to teach one or more processors which action associated with the at least one control input for each device of the multiple devices is to be performed in response to receiving the modified version of the verbal command; and
means for receiving user input to dynamically associate the modified version of the verbal command, based on the sentence embedding operation, with the at least one control input for each device of the multiple devices through use of user interaction displayed on the screen.

25. The apparatus of claim 24, wherein the means for displaying, the means for illustrating, the means for receiving, the means for performing the automatic speech recognition operation, the means for performing the sentence embedding operation, the means for providing feedback, the means for providing instructions, and the means for receiving user input are integrated into a headset.

26. The apparatus of claim 25, wherein the headset comprises a virtual reality headset, a mixed reality headset, or an augmented reality headset.

27. The apparatus of claim 24, wherein the means for displaying, the means for illustrating, the means for receiving, the means for performing the automatic speech recognition operation, the means for performing the sentence embedding operation, the means for providing feedback, the means for providing instructions, and the means for receiving user input are integrated into a vehicle.

28. The apparatus of claim 24, wherein the sentence embedding operation on the word sequence is based on semantic representations.

29. The apparatus of claim 24, wherein the sentence embedding operation on the word sequence is based on Bidirectional encoder representations from transformers (BERT).

30. The apparatus of claim 24, further comprising:
means for identifying a most similar stored vector of one or more stored vectors at least partially based on a difference between the vector and the most similar stored vector; and
determining that the modified version of the verbal command is not recognized as being associated with an action to be performed in response to the difference not satisfying a difference constraint.

* * * * *